United States Patent
Khan

(10) Patent No.: US 7,712,020 B2
(45) Date of Patent: May 4, 2010

(54) TRANSMITTING SECONDARY PORTIONS OF A WEBPAGE AS A VOICE RESPONSE SIGNAL IN RESPONSE TO A LACK OF RESPONSE BY A USER

(76) Inventor: Emdadur R. Khan, 5942 Foligno Way, San Jose, CA (US) 95138

( * ) Notice: Subject to any disclaimer, the term of this patent is extended or adjusted under 35 U.S.C. 154(b) by 986 days.

(21) Appl. No.: 10/104,430

(22) Filed: Mar. 22, 2002

(65) Prior Publication Data
US 2003/0182124 A1    Sep. 25, 2003

(51) Int. Cl.
*G06F 17/20* (2006.01)
(52) U.S. Cl. .................... 715/205; 379/88.17
(58) Field of Classification Search ............... 715/501, 715/513, 501.1, 205–207, 234; 379/88.01, 379/88.17
See application file for complete search history.

(56) References Cited

U.S. PATENT DOCUMENTS

| | | | |
|---|---|---|---|
| 5,774,628 A | | 6/1998 | Hemphill |
| 5,873,107 A | | 2/1999 | Borovoy et al. |
| 5,915,001 A | * | 6/1999 | Uppaluru ................. 379/88.22 |
| 5,953,392 A | | 9/1999 | Rhie et al. |
| 6,029,135 A | | 2/2000 | Krasle |
| 6,101,473 A | | 8/2000 | Scott et al. |
| 6,115,686 A | | 9/2000 | Chung et al. |
| 6,157,705 A | | 12/2000 | Perrone |
| 6,188,985 B1 | | 2/2001 | Thrift et al. |
| 6,282,511 B1 | | 8/2001 | Mayer |
| 6,282,512 B1 | | 8/2001 | Hemphill |
| 6,300,947 B1 | | 10/2001 | Kanevsky |
| 6,311,182 B1 | | 10/2001 | Colbath et al. |
| 6,418,199 B1 | | 7/2002 | Perrone |
| 6,574,601 B1 | * | 6/2003 | Brown et al. ............. 704/270.1 |
| 6,591,295 B1 | * | 7/2003 | Diamond et al. ........... 709/217 |
| 6,601,066 B1 | * | 7/2003 | Davis-Hall .................... 707/5 |
| 6,604,076 B1 | * | 8/2003 | Holley et al. ............. 704/270.1 |
| 6,823,311 B2 | | 11/2004 | Tetsumoto |
| 6,904,408 B1 | * | 6/2005 | McCarthy et al. ............. 705/2 |
| 2001/0053987 A1 | | 12/2001 | Kleinschmidt et al. |
| 2004/0006476 A1 | * | 1/2004 | Chiu ...................... 704/270.1 |
| 2004/0205614 A1 | * | 10/2004 | Keswa ....................... 715/523 |
| 2006/0010386 A1 | | 1/2006 | Khan |
| 2007/0156761 A1 | | 7/2007 | Smith |

OTHER PUBLICATIONS

Kemble, K., Voice-Enabling Your Web Sites, IBM Developer Works Website, Jun. 30, 2001.*
Voice XML FORUM, version 0.9, pp. 1-63, Aug. 17, 1999.*
USPTO; International Search Report PCT/US/2002/018695; Dec. 30, 2002; 2 pages.
Microsoft Corp., White Paper, "Microsoft Windows NT Server; The Microsoft Windows Telephony Platform: Using TAPI 2.0 and Windows to Create the Next Generation of Computer-Telephony Integration." 1996.

* cited by examiner

*Primary Examiner*—Cesar B Paula
(74) *Attorney, Agent, or Firm*—Stolowitz Ford Cowger LLP

(57) ABSTRACT

A method of facilitating access to the Internet involving vocal and aural navigation, selection and rendering of Internet content. Visual Internet content is selected and rendered to produce information in amounts appropriate for representation in concise aural form to facilitate vocal selection and navigation based upon such aural representation.

18 Claims, 14 Drawing Sheets

FIG. 6

```
<!-- saved from url=(0022)http://internet.e-mail -->
<!-- saved from url=(0022)http://internet.e-mail -->
<!-- saved from url=(0022)http://internet.e-mail -->
<!-- saved from url=(0022)http://internet.e-mail -->
<!-- saved from url=(0022)http://internet.e-mail -->
<!-- saved from url=(0022)http://internet.e-mail -->
<!-- saved from url=(0022)http://internet.e-mail -->
<html>
<head>
<title>InternetSpeech</title>
<meta http-equiv="Content-Type" content="text/html; charset=iso-8859-1
">
</head>

<body bgcolor="#006699" leftmargin="0" topmargin="0" marginwidth="0" m
arginheight="0">
<table width="800" border="0" cellspacing="0" cellpadding="0">
<tr>
<td colspan="2"><img src="images/logo.gif" width="155" height="85"><im
g src="images/top_left.gif" width="312" height="85"><a href="https://w
ww.internetspeech.com/internetspeech.com/support.htm"><img src="images
/monav_support.gif" width="50" height="85" border="0"></a><a href="abo
utus.htm"><img src="images/monav_aboutus.gif" width="59" height="85" b
order="0"></a><a href="news.htm"><img src="images/monav_news.gif" widt
h="48" height="85" border="0"></a><a href="jobs.htm"><img src="images/
monav_jobs.gif" width="52" height="85" border="0"></a><a href="partner
s.htm"><img src="images/monav_partners.gif" width="51" height="85" bor
der="0"></a><a href="index.htm"><img src="images/monav_home.gif" width
="73" height="85" border="0"></a></td>
</tr>
<tr valign="top">
<td width="155" bgcolor="#ffffff"> <img src="images/spacer.gif" width=
"155" height="1"><br>
<br>
<table border="0" cellspacing="0" cellpadding="3" align="center" width
="140">
<tr align="center">
<td colspan="2"><img src="images/demo_mov.gif" width="110" height="20"
> </td>
</tr>
<tr>
<td colspan="2"><img src="images/see_netecho.gif" width="113" height="
13"><br>
<font size="1" face="Verdana, sans-serif"><a href="http://www.macromed
ia.com/software/flashplayer/">Requires
Macromedia Flash</a></font></td>
</tr>
<!--<tr>
```

FIG. 7A

```
<td><img src="images/arrow.gif" width="14" height="14"></td>
<td><font size="1" face="Verdana, Arial, Helvetica, sans-serif" color=
"#006699">Menu
Options</font></td>
</tr>-->
<tr>
<td><img src="images/arrow.gif" width="14" height="14"></td>
<td><a href="flash/surfing.htm"><font size="1" face="Verdana, Arial, H
elvetica, sans-serif" color="#006699">Web
Browsing </font></a></td>
</tr>
<!--<tr>
<td><img src="images/arrow.gif" width="14" height="14"></td>
<td><font size="1" face="Verdana, Arial, Helvetica, sans-serif" color=
"#006699">E-commerce</font></td>
</tr>
<tr>
<td><img src="images/arrow.gif" width="14" height="14"></td>
<td><font size="1" face="Verdana, Arial, Helvetica, sans-serif" color=
"#006699">Search</font></td>
</tr>-->
<tr>
<td colspan="2"><img src="images/hear_netecho.gif" width="113" height=
"13"><br>
<font size="1" face="Verdana, sans-serif">Requires Audio Program. Clic
k the right mouse button to download.</font></td>
</tr>
<!--<tr>
<td><img src="images/arrow.gif" width="14" height="14"></td>
<td><font size="1" face="Verdana, Arial, Helvetica, sans-serif" color=
"#006699">Menu
Options</font></td>
</tr>-->
<tr>
<td><img src="images/arrow.gif" width="14" height="14"></td>
<td><a href="audio/email.wav"><font size="1" face="Verdana, Arial, Hel
vetica, sans-serif" color="#006699">E-mail</font></a></td>
</tr>
<tr>
<td><img src="images/arrow.gif" width="14" height="14"></td>
<td><a href="audio/stockquote.wav"><font size="1" face="Verdana, Arial
, Helvetica, sans-serif" color="#006699">Stock
Quote </font></a></td>
</tr>
<!--<tr>
<td><img src="images/arrow.gif" width="14" height="14"></td>
<td><font size="1" face="Verdana, Arial, Helvetica, sans-serif" color=
"#006699">E-commerce</font></td>
```

FIG. 7B

```
</tr>
<tr>
<td><img src="images/arrow.gif" width="14" height="14"></td>
<td><font size="1" face="Verdana, Arial, Helvetica, sans-serif" color=
"#006699">Search</font></td>
</tr>-->
</table>

<br>
<br>
<table border="0" cellspacing="0" cellpadding="3" align="center">
<tr>
<td><a href="signup.htm"><img src="images/target_signupnow_white.gif"
width="90" height="56" border="0"></a></td>
</tr>
<tr>
<td><a href="/loginF.htm"><img src="images/target_login_white.gif" wid
th="90" height="56" border="0"></a></td>
</tr>

</table>
</td>
<td width="645"><img src="images/spacer.gif" width="645" height="1"><b
r>
<br>
<br>

<table width="530" border="0" cellspacing="0" cellpadding="0" align="c
enter">
<tr align="center">
<td valign="top" width="33%"><a href="consumers.htm"><img src="images/
consumers.gif" width="155" height="236" border="0"></a><br>

</td>

<td valign="top" width="33%"><a href="business.htm"><img src="images/b
usiness.gif" width="155" height="236" border="0"></a></td>
<td valign="top" width="33%" rowspan="2"><a href="news.htm"><img src="
images/latestnews.gif" width="155" height="40" border="0"></a><br>
<table width="132" border="0" cellspacing="0" cellpadding="2" align="c
enter">
<tr valign="top">
<td>

<p> <a href="tata.pdf"><font size="1" face="Arial, Helvetica, sans-ser
if" color="#FFFFFF">3-11-02–
```

FIG. 7C

```
TATA Consulting Services - "Tata Consultancy Services to offer netEcho
  Voice Internet Solution"</font></a></p>

<p> <a href="indiawest.htm"><font size="1" face="Arial, Helvetica, san
s-serif" color="#FFFFFF">1-11-02–
INDIAWEST - "InternetSpeech Speeds Web Connections Via Voice"</font></
a></p>

<p> <a href="11-29-01.htm"><font size="1" face="Arial, Helvetica, sans
-serif" color="#FFFFFF">11-29-01–
Q COMM adds voice Internet service to Qxpress platform</font></a></p>

<p> <a href="11-08-01.htm"><font size="1" face="Arial, Helvetica, sans
-serif" color="#FFFFFF">11-08-01–
Internet Speech Signs Agreement With Preferred Voice To Deliver Speech
-Driven Email Manager To Telecom Carriers</font></a></p>

</font></a></p>
</td>
</tr>
</table>
</td>
</tr>

<tr align="center">
<td valign="top" width="66%" colspan="2"><br>
<a href="signup.htm"><img src="images/special.gif" width="168" height=
"100" border="0"></a></td>
</tr>

<tr align="center">
<td valign="top" width="66%" colspan="2"><br>
</td>
</tr>

<tr>
<td valign="top" colspan="3">
<table width="100%" border="0" cellspacing="0" cellpadding="8">
```

FIG. 7D

```
<tr>
<td><font size="2" face="Verdana, Arial, Helvetica, sans-serif" color=
"#FFFFFF">netECHO™
by InternetSpeech lets people unleash the power of the Internet simply
 with the
sound of their voice. netECHO™ lets users give simple voice comma
nds like
"Yahoo," or "e-mail" to get the Net-based information they want. See h
ow easy
it is to use by checking out our demo.</font></td>
</tr>
</table>
</td>
</tr>
</table>
</td>
</tr>
<tr valign="top">
<td width="155" bgcolor="#FFFFFF" valign="bottom"><img src="images/lef
tbottom.gif" width="155" height="16"></td>
<td width="620" align="center"> <br>
<font face="Verdana" size="1" color="#FFFFFF">Copyright © 2000-20
01 InternetSpeech.
All Rights Reserved. <br>
Designed by</font><font face="Verdana" size="1"> <a href="http://www.i
identity.com"><font color="#ffffff">Interactive
Identity</font></a> <br>
<a href="http://www.internetspeech.com/tos.htm"><font color="#ffffff">
Terms of
Service</font></a> <br>
<a href="http://www.internetspeech.com/privacy.htm"><font color="#ffff
ff">Privacy
Policy</font></a> </font></td>
</tr>
</table>
<br>
<br>
</body>
</html>
```

FIG. 7E

TRANSMITTING SECONDARY PORTIONS OF A WEBPAGE AS A VOICE RESPONSE SIGNAL IN RESPONSE TO A LACK OF RESPONSE BY A USER

BACKGROUND OF THE INVENTION

1. Field of the Invention

The present invention relates to a method for accessing the Internet, and more particularly to accessing and navigating the Internet through the use of an audio interface, e.g., via standard POTS (plain old telephone service), with vocal and aural navigation, selection and rendering of the Internet content.

2. Description of the Related Art

The number of Internet access methods has increased with the rapid growth of the Internet. World Wide Web (WWW) "surfing" has likewise increased in popularity. Surfing or "Internet surfing" is a term used by analogy to describe the ease with which a user can use the waves of information flowing around the Internet to find desired or useful information. The term surfing as used in this specification is intended to encompass all of the possible activities a user can participate in using the Internet. Beyond looking up a particular Internet resource or executing a search, surfing as used herein is intended to include playing video games, chatting with other users, composing web pages, reading email, applying for an online mortgage, trading stocks, paying taxes to the Internal Revenue Service, transferring funds via online banking, purchasing concert or airline tickets, etc. Various kinds of web browsers have been developed to facilitate Internet access and allow users to more easily surf the Internet. In a conventional web interface, a web browser (e.g., Netscape Navigator® which is part of Netscape Communicator® produced by Netscape Communications Corporation of Mountain View, Calif.) visually displays the contents of web pages and the user interacts with the browser visually via mouse clicking and keyboard commands. Thus, web surfing using conventional web browsers requires a computer or some other an Internet access appliance such as a WB-2001 WebTV® Plus Receiver produced by Mitsubishi Digital Electronics America, Inc., of Irvine, Calif.

Recently, some web browsers have added a voice based web interface in a desktop environment. In such a system, a user can verbally control the visual web browser and thus surf the Internet. The web data is read to the user by the browser. However, this method of Internet access is not completely controllable by voice commands alone. Users typically must use a mouse or a keyboard to input commands and the browser only reads the parts of the web page selected using the mouse or the keyboard. In other words, existing browsers that do allow some degree of voice control still must rely on the user and visual displays to operate. In addition, these browsers require that the web data to be read aloud must be formatted in a specific way (e.g., the shareware Talker Plug-In written by Matt Pallakoff and produced by MVP Solutions Inc. of Mountain View, Calif., can be used with Netscape Commerce Server and uses files formatted in accordance with a file format identified by the extension "talk".

Some commercially available products (e.g., Dragon Dictate® from Dragon Systems Inc. of Newton, Mass.) can read a web page as displayed on a conventional browser in the standard web data format, however, the particular portion of the page to be read must be selected by the user either via mouse or voice commands. A critical limitation of these systems is that they require the user to visually examine the web data and make a selection before any web data to speech conversion can be made. This limitation also exists when using these systems to surf the web. The user needs to look at the browser and visually identify the desired Uniform Resource Locator (URL), or use a predetermined stored list of URLs, and then select the desired URL by voice commands.

For reasons of increased mobility, it would be more desirable to be able to access and surf the Internet without being required to visually perceive the web data. Furthermore, it would be desirable to allow for "audio-only" access to the Internet such that authors of web pages need not provide web data in specialized formats for audio playback. However, the Internet is primarily a visual medium with information designed to be accessed visually, i.e., by looking at it. Accordingly, the information is displayed with visual access in mind, resulting in use of columns, tables, frames, color, bolded text, various font sizes, variable positioning of text and images, popup windows and so on. During observation, the human brain processes such information and selects the content that the user is interested in reading. When such information is accessed by voice, normally all of the associated text is extracted after filtering out graphics, banners, images, HTML and XML tags, and other unwanted nuances not useful to audio playback. Listening to such content may require much time and thereby lose the interest of the user. Also, selecting part of the text or navigating within a large amount of text displayed for visual access in mind is very difficult.

What would be helpful is an appropriate way of rendering the Internet content such that a relatively small amount of text is produced, quite suitable for audio playback, for facilitating further navigation and selection of content while still accurately representing the source data, i.e., the visual web page.

Additionally, some further important issues relating to accessing the Internet by voice include inter- and intra-page navigation, finding the correct as well as relevant contents on a linked page, and assembling the right contents from a linked page.

SUMMARY OF THE INVENTION

In accordance with the presently claimed invention, selection and rendering of Internet content is facilitated when accessing the Internet using vocal and aural navigation techniques. Visual Internet content is selected and rendered to produce information in amounts appropriate for representation in concise aural form to facilitate vocal selection and navigation based upon such aural representation. Such rendering of the visual Internet content is done using the normal visual characteristics of such content, including text size and length, color, presence and density of Internet links, and overall density of the content. (It should be noted that the terms "Internet" and "web" are intended to be interchangeable in that information accessed via the Internet can include information other than that found on the World Wide Web per se.)

In accordance with one embodiment of the presently claimed invention, a method of facilitating access to the Internet involving vocal and aural navigation, selection and rendering of Internet content includes the steps of:

establishing a bi-directional voice communication link between an audio Internet access provider and a user;

receiving, via said bi-directional voice communication link, a voice command signal corresponding to a Internet surfing command;

locating an Internet page corresponding to said Internet surfing command;

identifying one or more highlights associated with said Internet page;

transmitting, via said bi-directional voice communication link, a voice response signal corresponding to an Internet data signal representing a recitation of said one or more highlights;

receiving, via said bi-directional voice communication link, a voice selection signal identifying a selected one of said recited one or more highlights;

locating Internet content related to said selected one of said recited one or more highlights; and transmitting, via said bi-directional voice communication link, a voice content signal corresponding to a selected portion of said related Internet content.

In accordance with another embodiment of the presently claimed invention, a method of accessing the Internet involving vocal and aural navigation, selection and rendering of Internet content includes the steps of:

establishing a bi-directional voice communication link between an audio Internet access provider and a user;

initiating access to an Internet page corresponding to an Internet surfing command by transmitting, via said bi-directional voice communication link, a voice command signal corresponding to said Internet surfing command;

receiving, via said bi-directional voice communication link, a voice response signal corresponding to an Internet data signal representing a recitation of one or more highlights identified as being associated with said Internet page;

initiating access to Internet content related to a selected one of said recited one or more highlights by transmitting, via said bi-directional voice communication link, a voice selection signal identifying said selected one of said recited one or more highlights; and receiving, via said bi-directional voice communication link, a voice content signal corresponding to a selected portion of said related Internet content.

BRIEF DESCRIPTION OF THE DRAWINGS

FIG. 6 depicts an example of a web page.

FIGS. 7A-7E depict the source code for the web page of FIG. 6.

DETAILED DESCRIPTION OF THE INVENTION

The present invention is preferably embodied as a computer program developed using an object oriented language that allows the modeling of complex systems with modular objects to create abstractions that are representative of real world, physical objects and their interrelationships. However, it will be readily understood by one of ordinary skill in the art that the subject invention can be implemented in many different ways using a wide range of programming techniques as well as general purpose hardware systems or dedicated controllers.

The present invention is used in accessing the Internet using only voice and audio instead of conventional visual inputs and displays. A POTS (plain old telephone service) can be used to access the Internet by calling an "audio" ISP (Internet service provider). An audio ISP includes a conventional data ISP that is buffered by an apparatus capable of performing a selective translation function using artificial intelligence methods. This selective translation function can be performed by an apparatus called an Intelligent Agent (IA) as described in more detail below. The IA translates Internet data into spoken language as well as translate spoken data and commands into Internet web surfing commands.

An audio ISP uses a standard telephone (POTS, digital or analog cellular telephone, PCS telephone, satellite telephone, etc.) instead of a modem, telephone line and a direct connection to a conventional data ISP. An audio ISP uses TAPI (telephony application programming interface) or a similar protocol to connect a standard telephone to a computer or other Internet appliance. The IA takes information from the caller in the form of voice commands, accesses the Internet, retrieves the desired information, and reads it back to the caller using voice. Using voice input and output signals only, the caller can surf the net by interacting with the IA. The IA eliminates the need for a conventional visual web browser.

Figure 1:
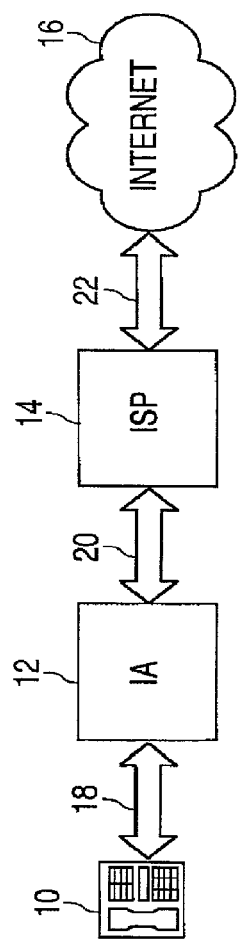
FIG. 1 depicts a high level block diagram of an example of a system for accessing the Internet using a standard telephone.

Turning now to FIG. 1, an intelligent agent (IA) 12 allows a user, via a standard telephone 10, to communicate with the Internet 16 through a conventional ISP 14. The IA 12 receives voice input signals 18 from the user via the telephone 10. One of ordinary skill in the art would recognize that any number of audio-only-based bi-directional communication systems could be used in place of the standard telephone 10 including digital or analog cellular telephones, PCS telephones, satellite telephones, two-way radios, etc. The IA 12 initiates an Internet session by providing a signal 20 to a conventional ISP 14. The IA 12 can connect to the conventional ISP 14 using any number of well known methods including the use of dial-up modems, cable modems, Digital Subscriber Lines, Integrated Services Digital Networks, T1/T3 lines, Asynchronous Transfer Mode lines, local area network high speed bus, etc. The conventional ISP generates an output signal 22 to access the Internet 16 as is known in the art. A web page from the Internet 16 is sent to the IA 12 via the conventional ISP 14. The IA 12 interprets the contents of the web page and determines which parts of the web page that need to be converted from text to speech (TTS), text table to speech, graphics to speech (GTS), or graphics to text to speech (GTTTS using Optical Character Recognition (OCR) and then TTS). The IA 12 then converts the selected parts of the page to speech and sends a signal 18 containing the speech to the user via the telephone 10. The user via the telephone 10 can continue to request other URLs. In addition, the user can interact with web pages such as search engines to locate a desired URL. The IA 12 repeats the process of getting the new web page and sending back an audio-only version to the user via the telephone 10 using, for example, a standard telephone line.

The IA 12 is configurable to provide a user-selectable level of detail in the audio-only version of a retrieved web page. Thus, for example, a web page containing a list of matching URLs generated by a search engine in response to a query could be read to the user in complete detail or in summary form.

Figure 2:
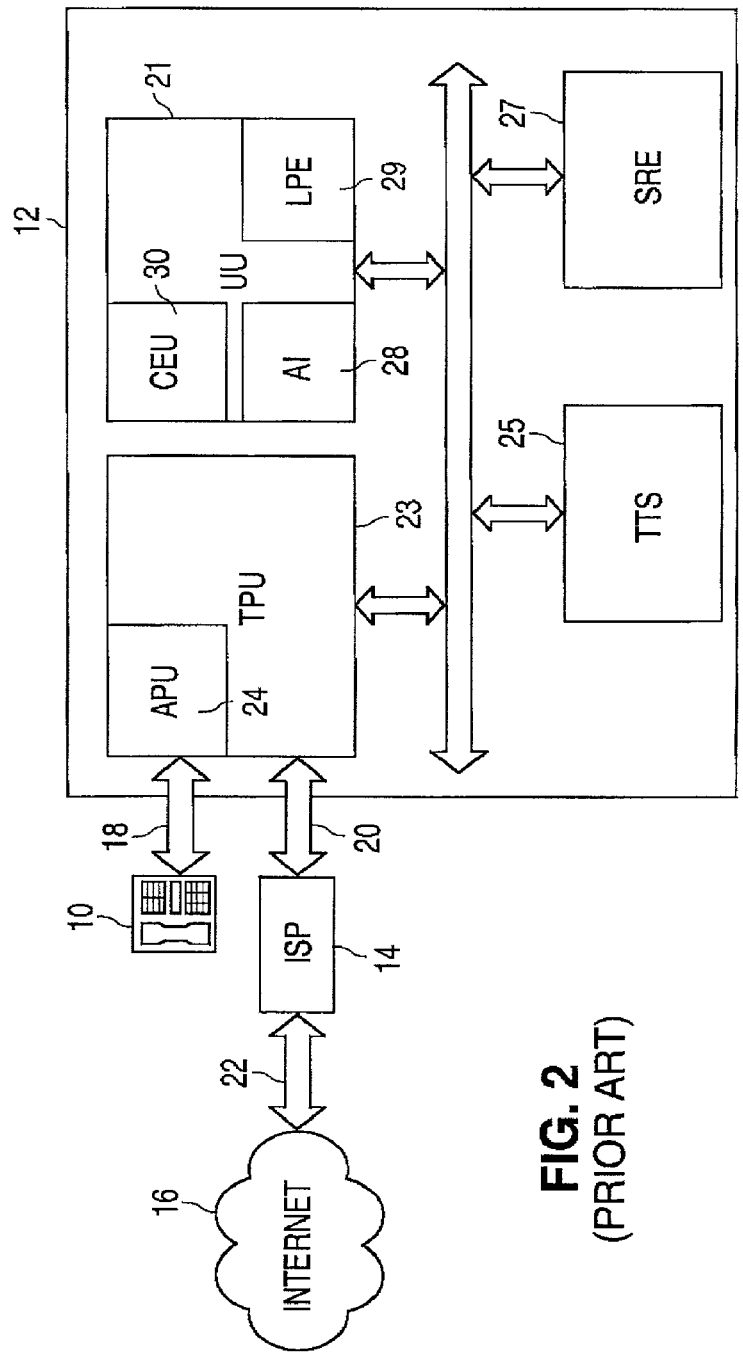
FIG. 2 depicts a block diagram of an example of an intelligent agent (IA) component of the system depicted in FIG. 1.

Referring now to FIG. 2, the IA 12 of FIG. 1 is described. The IA 12 provides an intelligent interface between the user on the telephone 10 and the Internet 16. In one embodiment, the IA 12 includes a speech recognition engine (SRE) 27, a text to speech conversion engine (TTS) 25, an understanding unit (UU) 21 that understands both the contents of the web page and the user's spoken voice, and a transaction processing unit (TPU) 23. While these components of the IA 12 are depicted as individual hardware circuits coupled together via a single bus, one of ordinary skill in the art would understand that many different hardware architectures could be used and likewise, the entire IA 12 (or parts of it) could be implemented as software operable to run on a general purpose computer or even is another data processing device.

The TPU 23 communicates with the user via the telephone 10 and the Internet 16 using signals 18 and 20. The users' telephone calls are answered by the answer phone unit (APU) 24 which is preferably embodied as a telephone card or modem and is part of the TPU 23. The TPU 23 communicates with the user via the telephone 10 using, for example, the TAPI standard, a protocol developed by Microsoft Corporation of Redmond, Wash., that is used in connecting a telephone with a computer over a standard telephone line (see Microsoft Corp., White Paper, "Microsoft Windows NT Server; The Microsoft Windows Telephony Platform: Using TAPI 2.0 and Windows to Create the Next Generation of Computer-Telephony Integration." p. 34,1996, incorporated herein by reference). In one embodiment, the TPU 23 communicates with the Internet 16 via the conventional data ISP 14 using: a modem and a telephone line; a cable modem and a cable line; or an Ethernet connection as is known in the art. Thus, the IA 12 integrates an audio ISP with conventional data ISP using a modem or Ethernet connection. This form of Intelligent Agent operates as a true "voice browser" in that ordinary Internet content can be accessed and rendered into audio form for reading back to the user, as opposed to a conventional "voice browser" that can only read back content which has been originally written or rewritten in some form of voice-enabled language, such as Voice Extensible Markup Language (VXML).

The UU 21 is preferably implemented as a programmed computer processor including the normally associated memory and interface ports as is well known in the art. The UU 21 is operative to determine what part of a web page is graphics, what part is a dynamic advertisement, what part is an interactive program, which text is a link to a URL, etc. and makes decisions accordingly. The UU 21 is also equipped with means to understand a user's commands. The UU 21 uses a language processing engine (LPE) 29 to interpret multiple words received from the user. The UU 21 uses an artificial intelligence (AI) unit 28 that includes one or more expert systems, probabilistic reasoning systems, neural networks, fuzzy logic systems, genetic algorithm systems, and combinations of these systems and other systems based on other AI technologies (e.g., soft computing systems). In order to understand the users' commands, the UU 21 uses the SRE 27 to convert users' commands to text. Before sending the web page text to the user via the telephone 10, the UU 21 selectively converts text to speech using the TTS unit 25. The UU 21 allows the user to interact with Internet web pages by creating a complete audio representation of the web pages. Thus, if a web page includes a dynamic program such as a Java program to calculate a mortgage payment for example, the UU 21 would execute the program within the IA 12 and describe the display that would have been generated by a conventional visual browser. The IA 12 can also use the UU 21 to identify and interpret audio formatted data, including audio hypertext mark up language (HTML) tags.

The UU 21 also includes a client emulation unit (CEU) 30 that allows the UU 21 to execute web client type programs such as Java and Java script programs that would normally execute on a user's client computer. The CEU 30 can spawn a virtual machine (e.g., a Microsoft Windows NT window), execute the client program to generate the associated displays, and pass the display data to the UU 21 to be translated and relayed to the user as described above. In this way, users are able to execute and interact with web pages that include executable programs.

Figure 3:
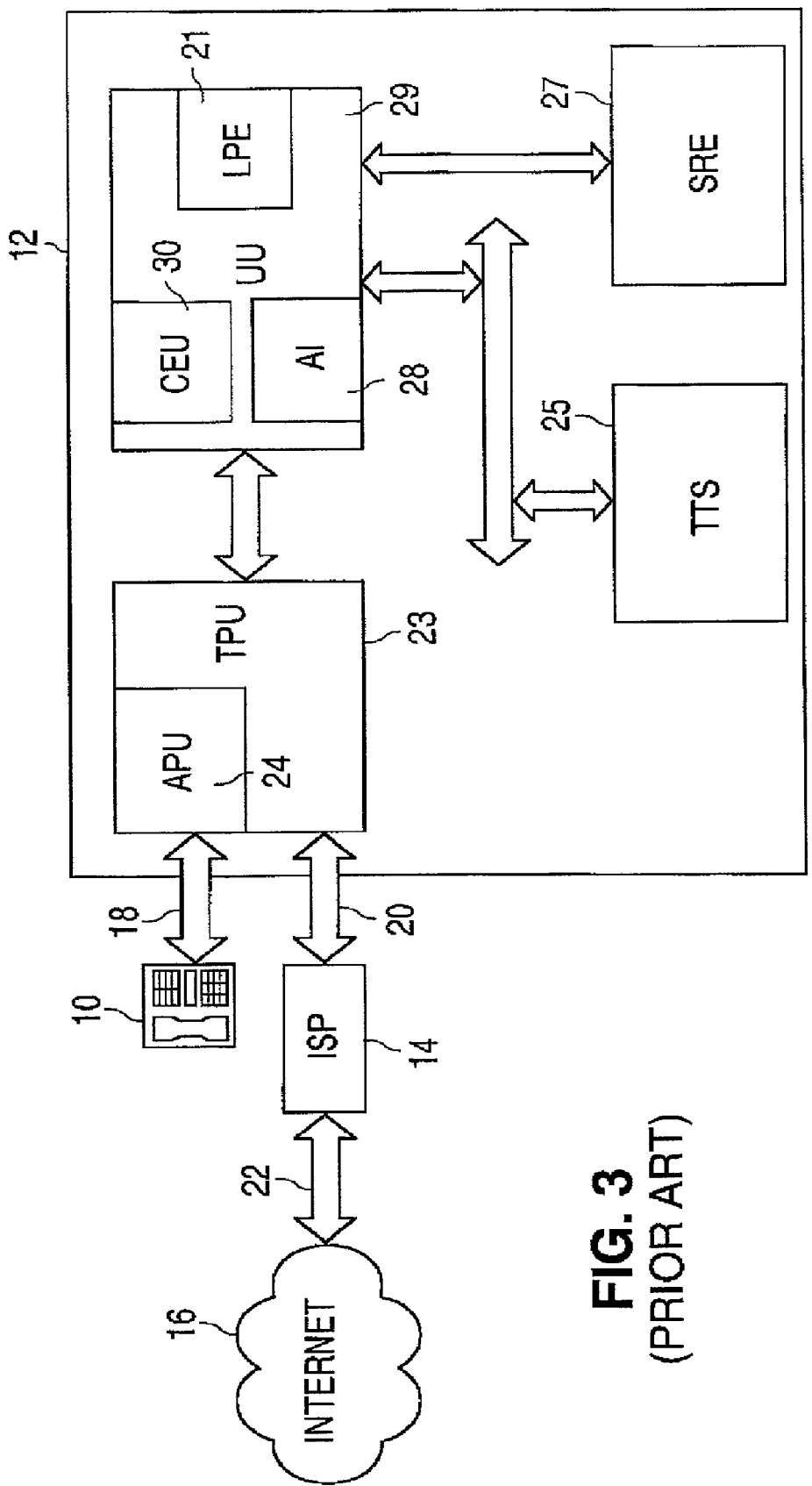
FIG. 3 depicts a block diagram of a second example embodiment of an intelligent agent (IA) component of the system depicted in FIG. 1 in accordance with the present invention.

FIG. 3 depicts an alternate architecture for the IA 12. The individual functional components of the IA 12 are identical to those described in FIG. 2 and as such the components are identified using the same reference numerals. Such embodiment of FIG. 3 provides an arrangement for the functional components that can allow for a more optimized operation.

Figure 4:
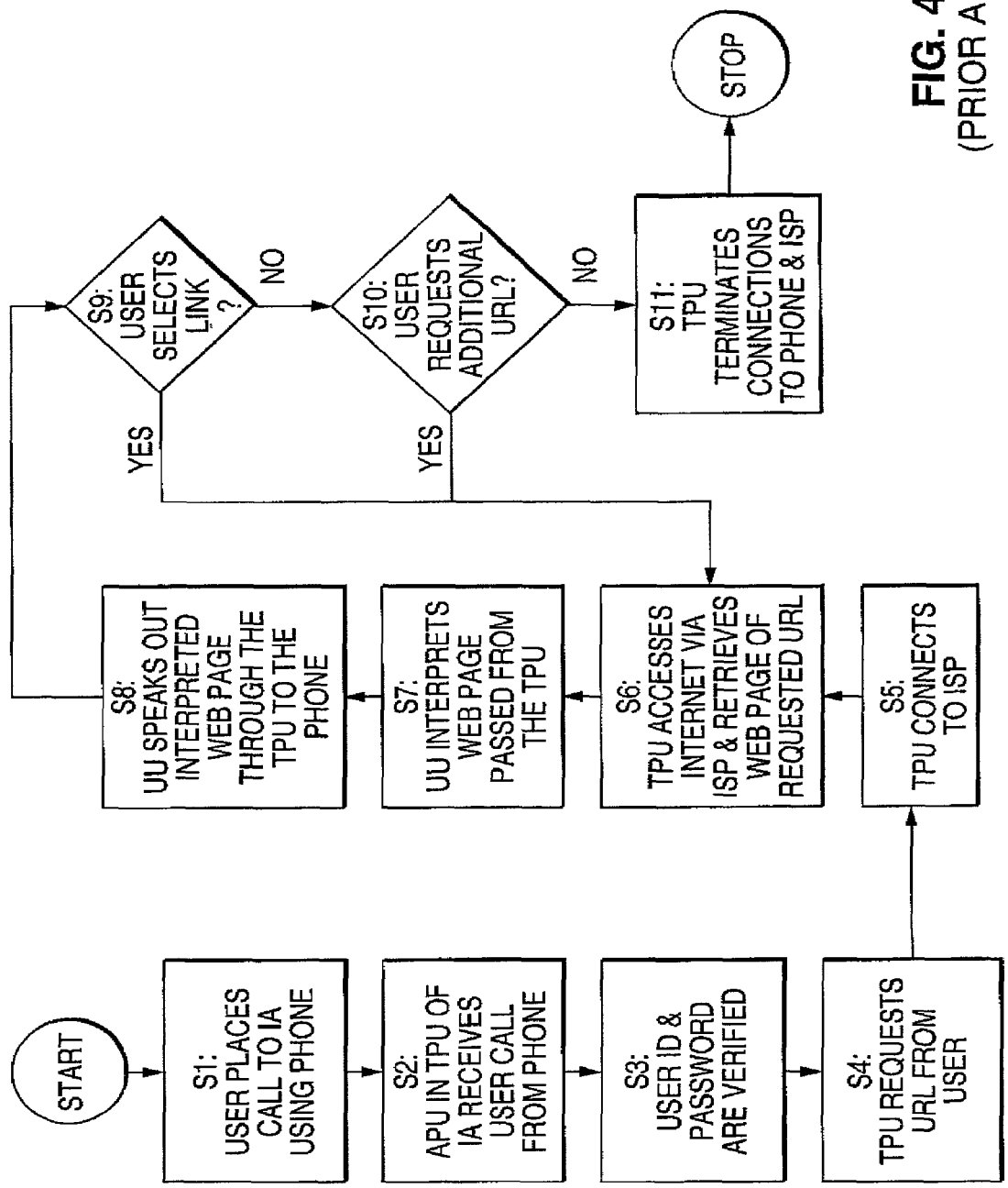
FIG. 4 depicts an example embodiment of a method of accessing the Internet using a standard telephone in accordance with the present invention.
Figure 5A:
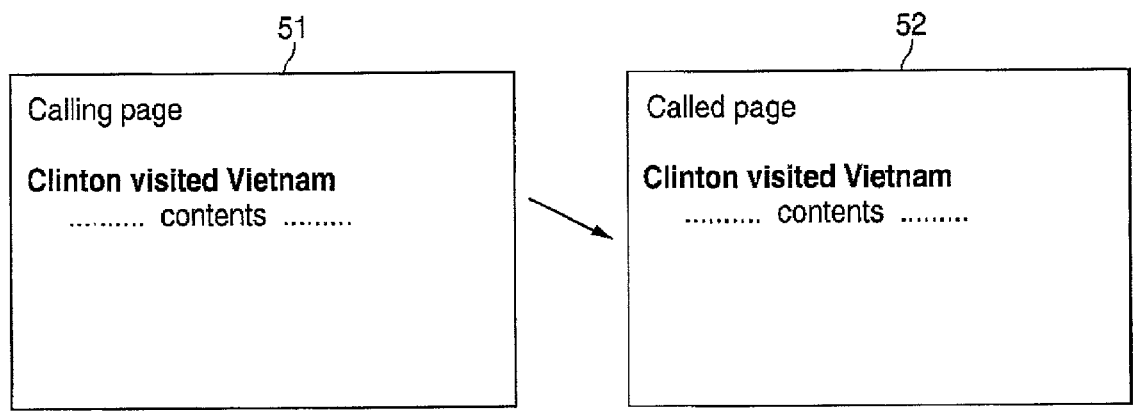
FIGS. 5A-5D depict various levels of difficulty when rendering Internet content from a linked page.
Figure 5B:
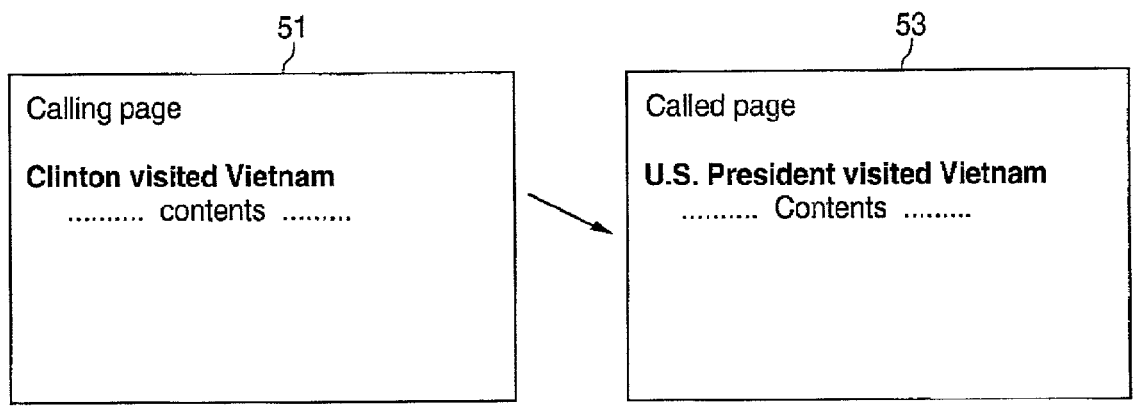
Figure 5C:
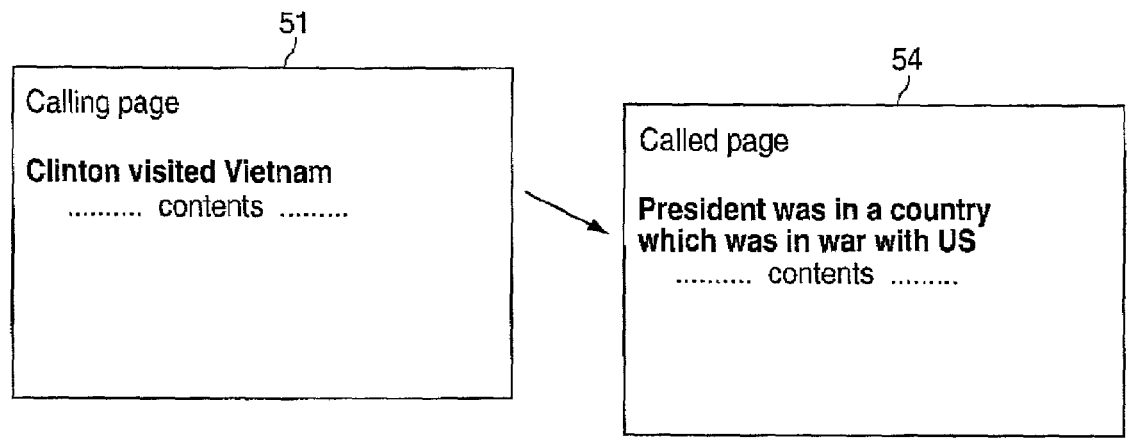
Figure 5D:
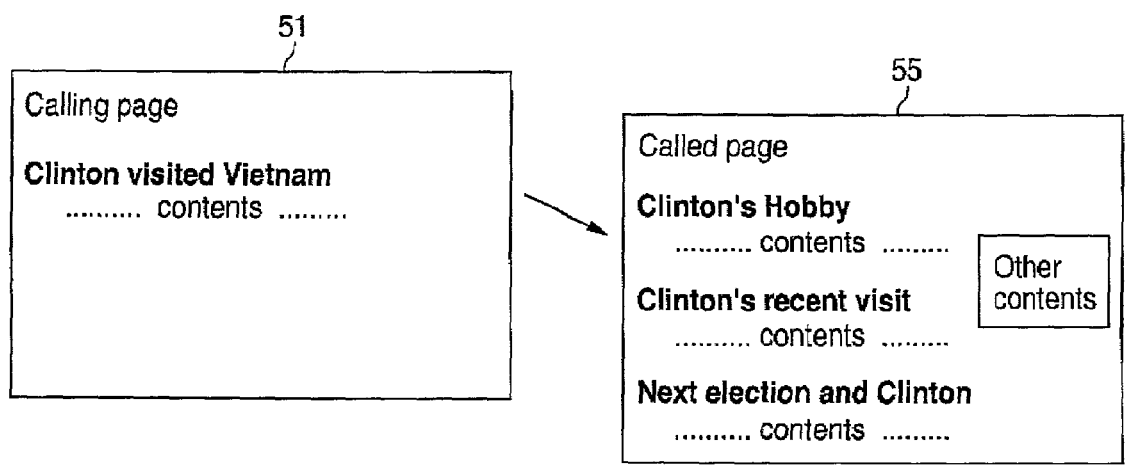

Turning now to FIG. 4, a flow chart depicting an example audio-only web browsing transaction using the systems illustrated in FIGS. 1, 2 and 3 is described. In steps S1 and S2, a user's telephone call to the IA 12 is answered by the APU 24 within the TPU 23 as depicted in FIG. 2. After checking the user's identification and password in step S3, the TPU 23 asks the user for a URL to access in step S4. A connection to the conventional ISP 14 is then created in step S5 using the TPU 23. After accessing the Internet and receiving the web page in step S6, the web page is interpreted by the UU 21 in step S7. In step S8, the UU 21 speaks out the appropriate text of the web page to the user via the telephone 10. Processing steps S6 through S8 are repeated until the user discontinues selecting links to new URLs in decision step S9 and stops requesting additional URLs in decision step S11. At that point, the TPU 23 terminates the connections to both the telephone 10 and the Internet 16.

In one embodiment, the IA 12 is implemented in software and executed on a server computer. It is important to note that a user does not need a conventional visual browser because the IA 12 effectively provides an audio ISP. However, the audio ISP can be implemented using a conventional visual web browser in conjunction with the IA 12. Additionally, it should be understood that the IA 12 and ISP 14 can reside on the same computer. Alternatively, an audio ISP can use other means of accessing and retrieving web pages such as the Win32 Internet (Winlnet) Application Programming Interface (API) as developed by Microsoft Corporation, described at http://pbs.mcp.com/ebooks/1575211173/ch17.htm, printed on Jun. 22, 1999, and hereby incorporated herein by reference. One of ordinary skill in the art would further understand that the IA 12 can also be used to access, manage, compose, and send email. In other words, a user can send or receive email, as well as perform other tasks such as searching on the Internet, using voice only working through the IA 12. Thus, a user can surf the web and can exploit all of the capabilities of the Internet, simply through human voice commands and computer generated-voice responses instead of using a visual browser running on a computer or other Internet appliance.

Rendering information that is visual in nature to an audio format is difficult. For information displayed visually, it is the brain of the user that quickly selects and correctly processes the information. Visual processing is inherently parallel, while audio processing is inherently serial. Thus, the content to be provided in audio form needs to be precise and short. It is not sufficient to simply parse the content from HTML or XML to text and then to audio. Determining and filtering unnecessary text is important for audio rendering. Different web sites uses different styles in displaying the visual information. To develop rules that will handle all possible cases of visual display style and still provide good audio content is very challenging.

Referring to FIGS. 5A-5D, rendering relevant information from a linked page is also difficult, especially when the link label in the calling page does not match the label in the called page. For example, if the calling page 51 has a link label of "Clinton visited Vietnam" and the called page 52 has a label of "Clinton visited Vietnam", then the problem is simple inasmuch as a good match exists between the labels in the calling page 51 and called page 52. However, if the called page 52 has a label like "US President visited Vietnam", then it is more difficult to match the labels and, hence, the contents of the linked pages 51, 53. A more difficult case is when the called page 54 has a label of "President was in a country which was in war with US" since in this case there are no matching words. An even more difficult case would be where the called page 55 has two or more labels with similar meaning.

Providing a voice portal that can convey a reasonable representation of Internet content presents many challenges. Navigation and selection by voice can be attempted in many ways. If a voice menu based approach is used, the number of menus and steps to follow will generally be so large as to be impractical. If the content is searched in response to questions by the user, the number of possible questions would also be so large as to be impractical. Plus, many problems would exist concerning voice recognition (due to the large vocabulary needed) and a need for an intelligent database that can be reliably accessed for retrieving the correct information.

For purposes of the present invention, various algorithms are used by the Intelligent Agent IA to do rendering, navigation and selection of the desired content. The subject algorithms use the information already available on the visual web pages, including elements such as columns, tables, frames, colors, bolded text, font sizes, positioning and popup windows. As discussed in more detail below, "page highlights" that provide important information or highlights of the accessed page corresponding to the URL are used. A small number of such highlights (e.g., three) are read at a time, with users given the opportunity to select any one of the highlights or topics at a time. Once a highlight has been selected, the content associated with that highlight is read to the user. An assumption behind this is that the related content exists and is somewhere in either the current page or a linked page perhaps a level or few down.

One example is where the related content is on the same page as the selected highlight. In that case, the Intelligent Agent IA reads the selected content from the current page (discussed in more detail below).

Another example is where the selected highlight is a link. In that case, the Intelligent Agent IA accesses the linked page to find the relevant content and read it to the user (discussed in more detail below).

Still another example is where multiple related content exists on the linked page. In that case, the Intelligent Agent IA provides for fine tuning the selection, after which the selected content is read to the user (discussed in more detail below).

Yet another example is where multiple related content exists on the linked page, but none of it can be easily identified and selected. In that case, the Intelligent Agent IA either provides such related content as next level highlights or reads them to the user in some logical order based on content density or semantic matching (discussed in more detail below).

Page highlights are determined using techniques similar to those that one would use to visually find a highlight on a page by looking at the page contents. Thus, it is based on page elements such as (without limitation) font sizes, links, colors, sizes of the content, language understanding, and so on. The Intelligent Agent IA examines the HTML and/or XML tags and such page elements and determines the highlights. Further techniques are used to determine which highlights are more important and hence should be read to the user first. One example of a basic algorithm to determine highlights is as follows:

```
If the content is with largest font size (largest font on the current page but
not part of a banner)
    Then
    {
        this is highlight #1.
        If this content is a link, then related content on the linked page
        will be read when this highlight is selected
        Else
        Associated content on the current page will be read when this
        highlight is selected. In this case association is determined by next
        paragraph or table or frame etc. that is directly related to this
        highlight.
        If there are more than one content with largest size and none of
        them are links, then priority is assigned to the highlight with
        largest content associated with it. If they are all links, the one
        with highest # of words has the highest priority. If they are
        mixture of links and non-links, then priority is assigned to the
        links.
    }
else
    If the content is flashing but not part of a banner
    Then
    {
        this is highlight #2.
        If there are more than one flashing content, the priority is decided
        based on the same algorithm outlined above for the largest font size.
    }
else
    {
        Use second largest font, followed by third largest font, etc., to
        determine the priority. When font sizes become same, then priority is
        determined using same algorithm as for the largest font size except that
        a content with Bold has the higher priority.
    }
```

It will be understood that variations of these techniques are possible. For example, flashing content may be treated with the highest instead of second highest priority. The goal is to use a technique that closely represents how a human user would select highlights when examining a visual web site. Also, if desired, banner advertisements can be retained as options for selection by the user.

Figure 6:
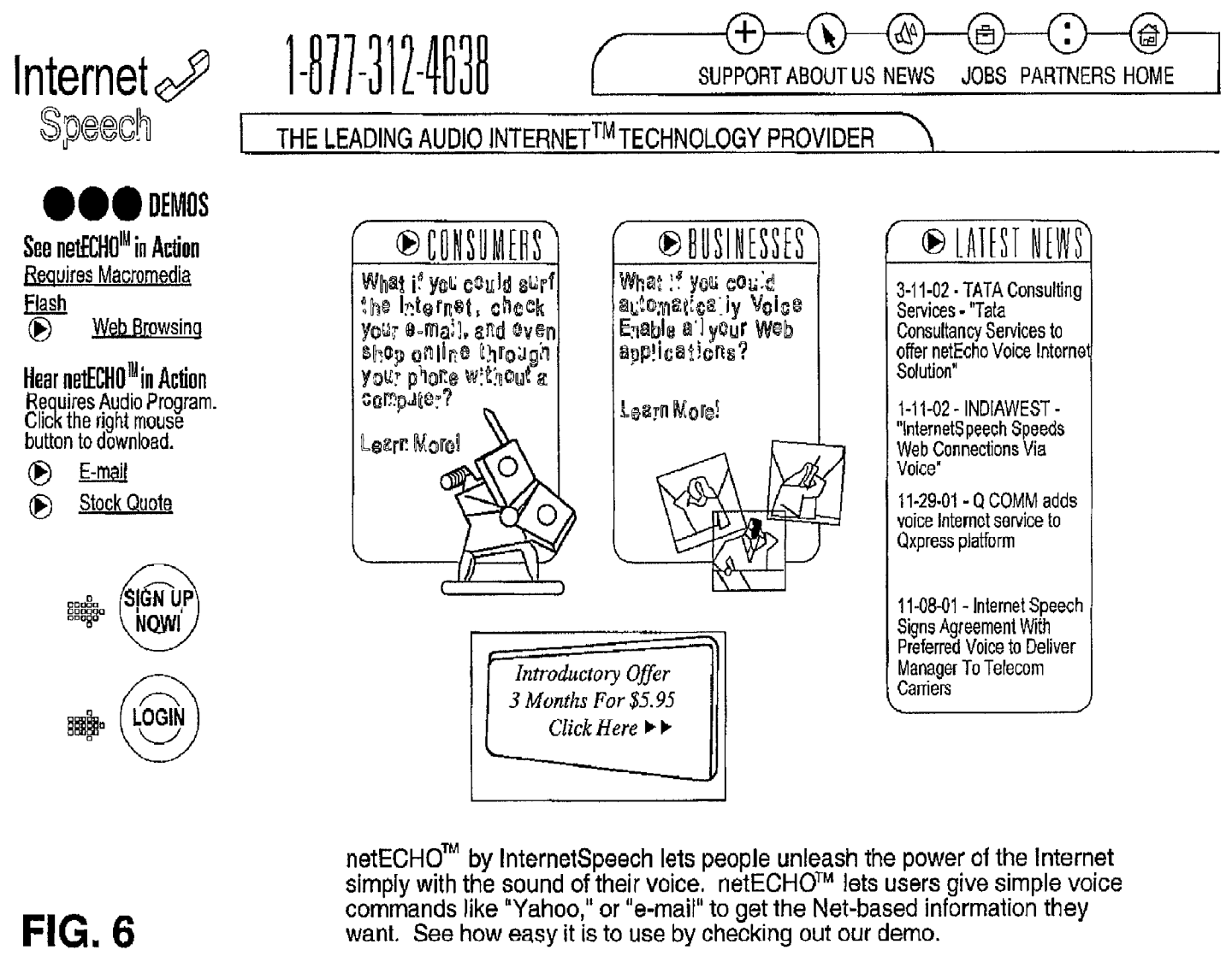

Referring to FIG. 6, one more specific example of how highlights can be selected in accordance with the presently claimed invention will be discussed, with reference also to FIGS. 7A-7E which contain the source code for the web page as depicted in FIG. 6. The contents labeled "Consumers", "Businesses" and "Latest News" have the largest font size. But these contents are GIF (Graphics Interchange Format) images, not pure text. Also, the contents associated with "Consumer" are part of a GIF image and are not pure text. Hence, this would not generally be selected as a highlight in normal operation. However, if the user wished to use it as a highlight, it can be made to do so. The link labeled "11-08-01 Internet Speech Signs . . . " has the largest number of words and hence is selected as highlight #1. The next highlight (highlight #2) is "3-11-02—TATA Consulting Services . . . " is a link with the second largest number of words. The third highlight is "11-29-01—Q COMM . . ." is a link with nine words. Instead of using the number of words, the number of characters might be more appropriate in some cases, such as where the content is in Chinese, Japanese or Korean.

The next set of highlights can be selected using a technique similar to that as outlined above. Clearly, the highlight identification techniques discussed herein provide important information in a logical manner that a user would normally use when observing a web page visually. Also provided are good navigation tools to access the next page for obtaining only relevant contents from the linked page (discussed in more detail below). Thus, such techniques "render" information from a visual web page into an audio format that is concise and pleasant for listening by the user.

Apart from using highlights, rendering can also be done by providing key words of a page and then using queries. In general, queries should include one or more of the key words. Queries can be a simple sentence or just a word or a few words. Using the word matching and content and link density analyses discussed in more detail below with the key words, appropriate related content can be selected.

The user may already know a few key words associated with a particular web site and may simply try using such key words without listening to any of the key words read from the page. Alternatively, a simple key word may not be found in a page but a user still can say other word(s) as part of the query, and if there is a match the relevant content can then be read out. If some confusion arises (e.g., multiple matches), the Intelligent Agent IA will ask the user more questions to minimize ambiguity and improve selection of the relevant content. If there is no match for the word(s) asked, semantic analysis and language understanding can be used to find and select relevant contents. For example, the user may say "U.S President" but the page may not contain this phrase or term. Instead the page may have the name of one U.S President (e.g., Clinton) and so the language understanding unit will match this with the query and will read back the content associated with this. If the page contains "Clinton" in multiple non-associated paragraphs, e.g., not next to each other or under separate topics, the Intelligent Agent IA will read the first sentence of each topic and ask the user which content he or she would like to hear.

Depending on the level of complexity, related contents are selected based on a variety of approaches that include: parsing and word matching; analysis of content density; and analysis of link density. For parsing and word matching, attempts are made to match words in the label of the highlight with words in the label of the highlights on the linked page. After a match is found, the content associated with the match is selected. Association can be based (without limitation) on frames, tables, paragraphs, etc. If multiple associations are found, then the most important association is selected first. Importance of association can be determined based upon semantic meaning, language understanding and processing, or simpler elements such as paragraph sizes. To save on the amount of computation needed, matching for all words in a sentence is not usually necessary. The relevant contents can often be found after matching a few words, since the page may have only one instance of the selected words in the desired sequence. If similar sequences of words are found more than once, contents can be read to the user based upon the priority as determined by the size of the paragraphs associated with such matches.

If no word matches are found, then the page is tested for content density and link density. If the content density is high, as compared to the link density, a key body portion of the content is identified and selected. Key body portions can be identified (without limitation) by length of contents, font sizes, colors, tables, frames, etc. Conversely, if the link density is high, as compared to the content density, then the highlight of the page is determined and presented so that user can link down to the next level to find the desired content.

Content density is determined by counting the total number of words (or letters or characters as appropriate, e.g., for Chinese or Japanese language pages), without considering links, divided by the total number of words (or letters or characters) while considering both links and non-links.

Link density is determined by either counting the total number of words (or letters or characters as appropriate, e.g., for Chinese or Japanese language pages) in the links, or counting the total number of links and dividing by the total number of words (or letters or characters) while considering both links and non-links.

If after performing the foregoing good content is still not found, more computation intensive approaches, e.g., semantic analysis, language processing or understanding, can be used to find more relevant content. These approaches are based upon semantic analysis, language processing and understanding using context information. Learning algorithms can be used to improve the semantic analysis and language understanding. With much improved language understanding, it will also be possible to make a summary of long paragraphs or contents. In such cases the key concept or statements in the first (and sometimes the second) and last paragraphs are noted. Contents with similar meaning (either explicit or implicit) are gathered and duplications are removed resulting in a summary. This is just an example. Other language understanding techniques based upon "summary" computations can also be used.

In the event that related content is still not found, and the page is not a link rich page (i.e., the density of links within the page is low), the entire section or page can then simply be read to the user.

Referring to FIGS. 8A-8D, an example of the methodology used to perform the rendering of Internet content as discussed above can be charted as shown and explained as follows.

Following the initial accessing 81 of a web page, a determination 82 is made as to whether any highlights exist on that page. As discussed above, page elements such as text font sizes, links, colors, amount of text, and so on are examined to make this determination 82. If it is determined that no highlights exist, all of the contents of the page are recited 83.

On the other hand, if it is determined that highlights do exist, selected highlights are recited 84. For example, if a number of highlights exist, the first three or four highlights can be recited to solicit feedback or commands from the user as to which highlight is to be selected for further processing. If no highlight is selected 85, then additional highlights are recited 84 for further selection opportunities for the user. When a highlight is selected 85, then a determination 86 is made as to whether the related content associated with the selected highlight is on the current web page. If not, then the linked page identified by the selected highlight is accessed 87. Following this, and also if the related content is on the current web page, a determination 88 is then made as to whether there are one or more word matches between the selected highlight and any portion of the related content.

If there is such a word match, then a determination 92 (FIG. 8B) is made as to whether or not there are multiple word matches. If not, then the selected contents are recited in order 95. On the other hand, if there are multiple word matches, then a determination 93 is made as to the size of the contents associated with each word match. Once the respective sizes have been determined, the matches are ordered 94 according to the sizes of their associated contents. Following that, the selected contents are recited in order 95.

Figure 8A:
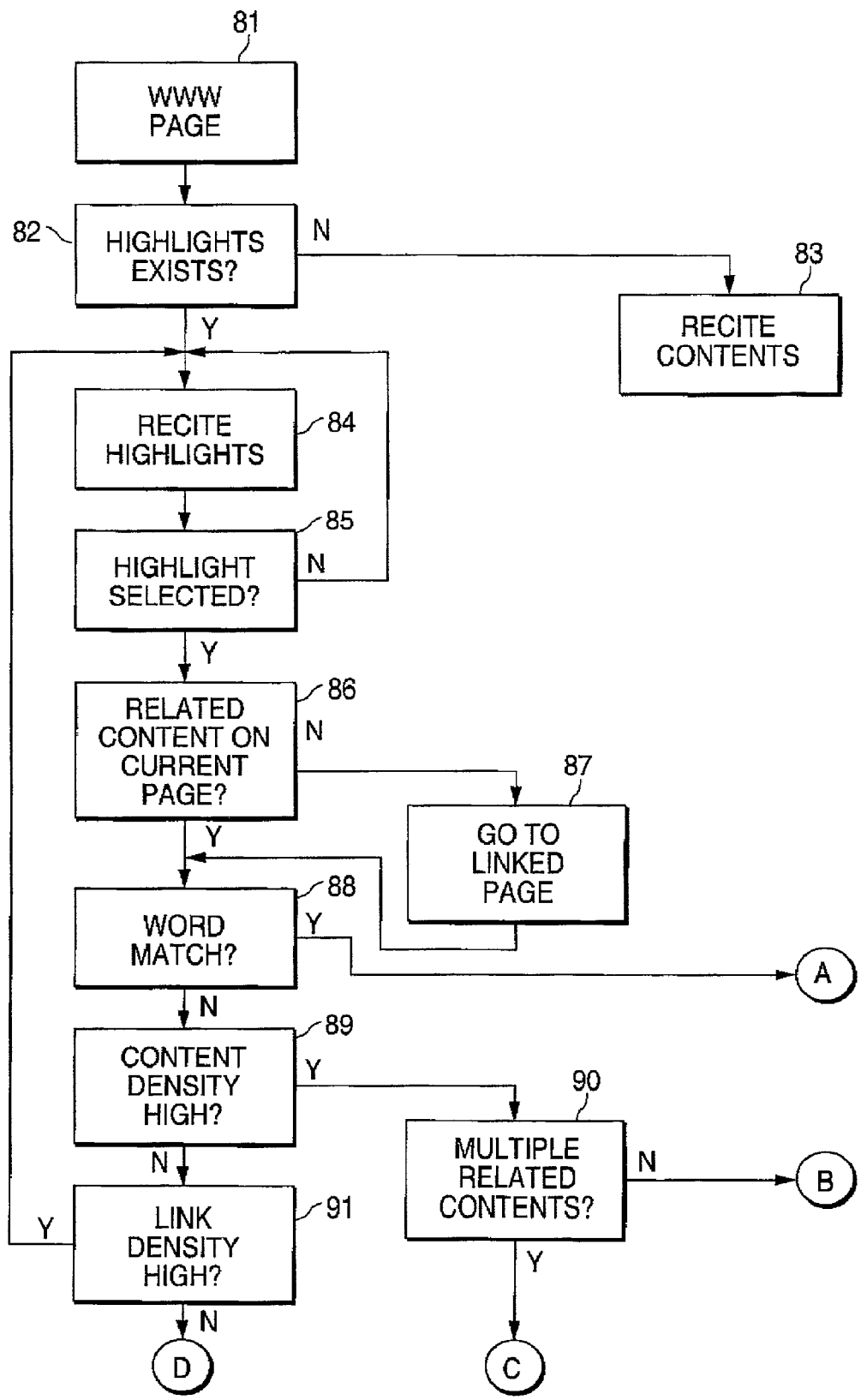
FIGS. 8A-8D depict a flowchart for a method in accordance with one embodiment of the present invention.
Figure 8B:
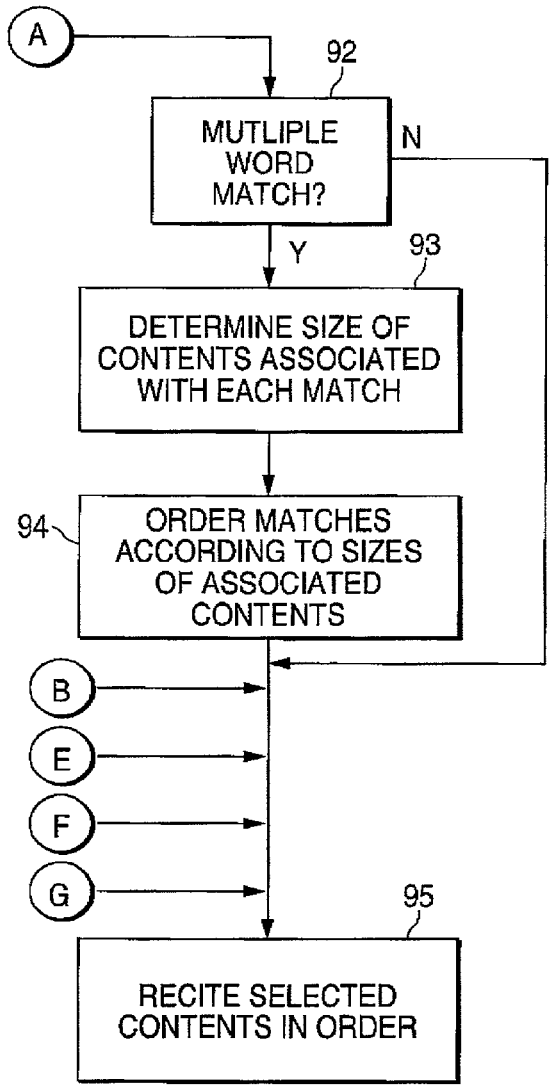
Figure 8C:
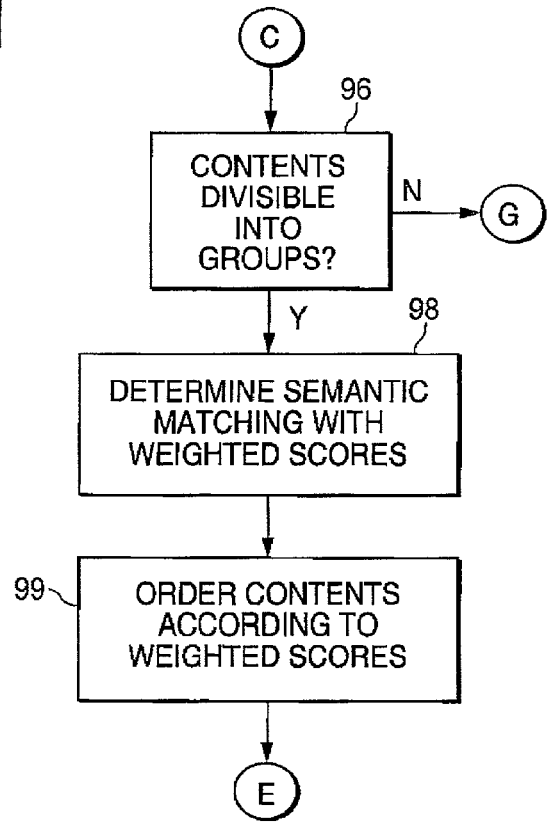
Figure 8D:
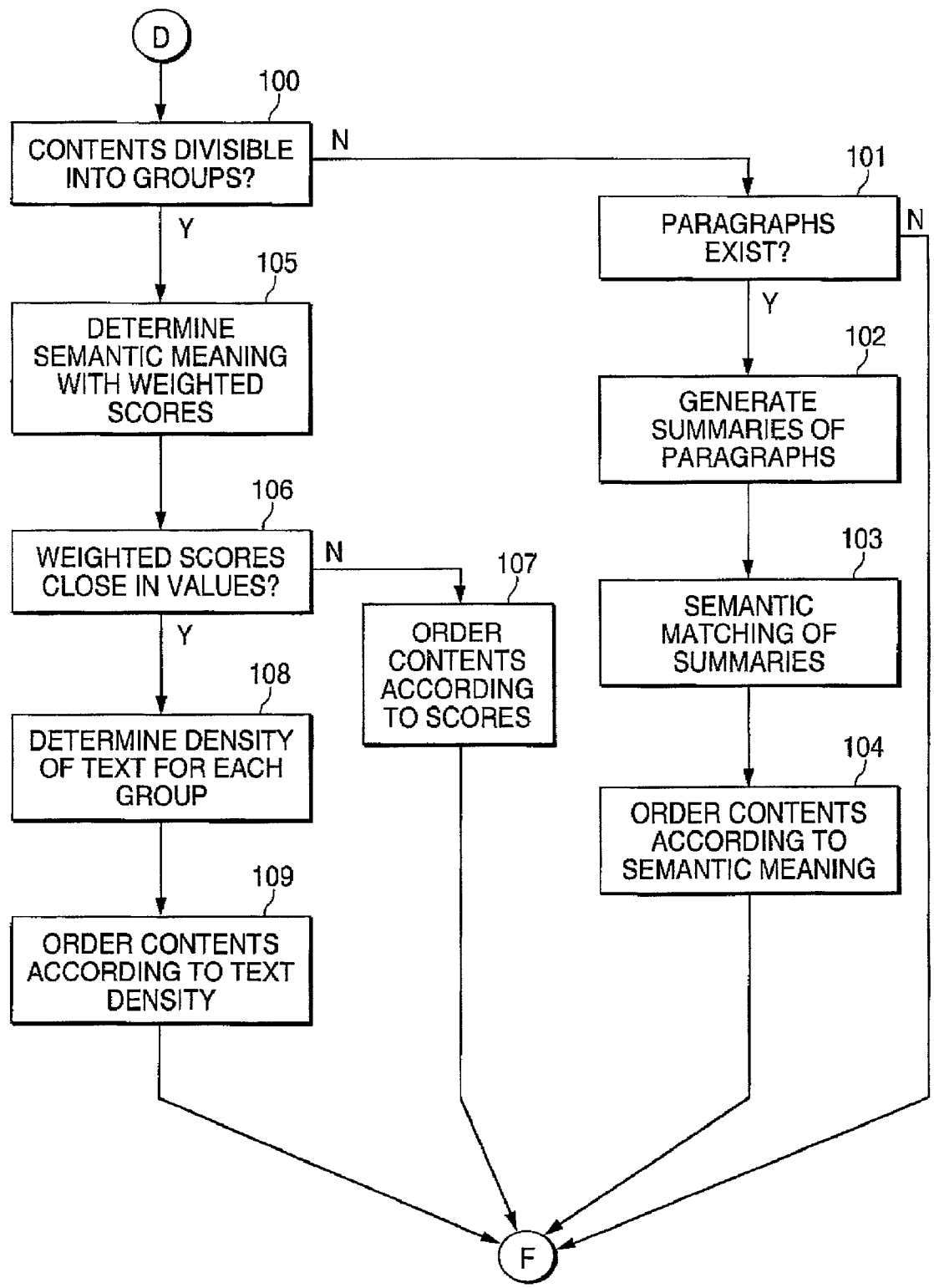

However, if the word match determination 88 (FIG. 8A) determines that there are no word matches, then a determination 89 is made as to whether the content density is high. In other words, it is determined whether a significant amount of content exists that is related to the originally selected highlight. If the content density is high, then a determination 90 is made as to whether there are multiple related contents. If not, then the selected contents are recited in order 95 (FIG. 8B). However, if it is determined that there are multiple related contents, then a determination 96 (FIG. 8C) is made as to whether the contents are divisible into groups. If they are not divisible, then the selected contents are recited in order 95. However, if the contents are divisible into groups, then a determination 98 is made about the semantic matching with weighted scores assigned according to the amount and degree of such matching. Following that, the contents are ordered 99 according to the weighted scores, following which the selected contents are recited in order 95.

If, however, the determination 89 (FIG. 8A) as to the content density finds that the content density is not high, then a determination 91 is made as to the link density. If the number of links is significant on the accessed web page, then highlights from such web page are recited 84 for soliciting a highlight selection from the user. Following that, the foregoing steps are repeated as appropriate.

If, however, it is determined that the link density is not high, then a determination 100 (FIG. 8D) is made as to whether the contents are divisible into groups. If the contents are not divisible into groups, then a determination 101 is made as to whether paragraphs exist in the content. If no paragraphs do exist, then the selected contents are recited in order 95 (FIG. 8B).

However, if paragraphs do exist, then summaries of the paragraphs are generated 102, following which a semantic matching 103 is performed upon the summaries. Then, according to the semantic meaning of the contents, such contents are placed into an appropriate order 104, following which the selected contents are then recited in order 95.

If, however, the original determination 100 finds that the contents are divisible into groups, then a determination 105 is made as to the semantic meaning, with appropriate weighted scores assigned. Following that, a determination 106 is made as to whether such weighted scores are close in their respective values. If the values are not close, then the contents are ordered 107 according to their weighted scores, and the selected contents are recited in order 95.

If, however, the weighted scores are close in values, then a determination 108 is made as to the density of the text for each group. Following that, the contents are ordered 109 according to their respective text densities. Finally, those selected contents are then recited in order 95.

Based upon the foregoing discussion, it will be recognized that all of the approaches and techniques discussed above are also applicable for languages other than English. Further, the selected contents can be converted into other languages in real time. For example, a web site written in English can be accessed by saying the name of the web site in Japanese and then listening to the selected content in Japanese by converting the English content into Japanese in real time.

While the method and apparatus of the present invention has been described in terms of its presently preferred and alternate embodiments, those skilled in the art will recognize that the present invention may be practiced with modification and alteration within the spirit and scope of the appended claims. The specifications and drawings are, accordingly, to be regarded in an illustrative rather than a restrictive sense. Further, even though only certain embodiments have been described in detail, those having ordinary skill in the art will certainly understand that many modifications are possible without departing from the teachings thereof. All such modifications are intended to be encompassed within the following claims.

What is claimed is:

1. A method of facilitating access to the Internet involving vocal and aural navigation, selection and rendering of Internet content, comprising:

establishing a bi-directional voice communication link between an audio Internet access provider and a user;

receiving, via bi-directional voice communication link, a voice command signal corresponding to an Internet command;

retrieving an Internet page corresponding to the Internet command;

identifying information of the Internet page using native content of the Internet page;

comparing sizes of selected portions of text associated with the identified information on the Internet page;

ordering the identified information on the Internet page responsive to the comparing;

transmitting, via the bi-directional voice communication link, a voice response signal corresponding to an Internet data signal representing a recitation of the identified information according to the ordering;

selectively receiving, via the bi-directional voice communication link, a voice selection signal identifying a selected one of the recited identified information;

locating Internet content related to the selected one of the recited information;

transmitting, via the bi-directional voice communication link, a voice content signal corresponding to a selected portion of the related Internet content; and absent receipt of the voice selection signal, responding to the voice response signal, automatically repeating the comparing and ordering for different portions of the identified information and automatically transmitting a second voice response signal representing a recitation of the different portions of the identified information according to the automatically repeated ordering.

2. A method of facilitating access to the Internet involving vocal and aural navigation, selection and rendering of Internet content, comprising:

establishing a bi-directional voice communication link between an audio Internet access provider and a user;

receiving, via the bi-directional voice communication link, a voice command signal corresponding to an Internet surfing command;

locating an Internet page corresponding to the Internet surfing command;

identifying one or more highlights associated with the Internet page by using native content of the Internet page, where the one or more highlights include a content portion, in addition to one or more links, of the Internet page;

comparing colors of selected portions of text associated with the one or more identified highlights on the Internet page;

ordering the one or more identified highlights on the Internet page responsive to the comparing;

transmitting, via the bi-directional voice communication link, a voice response signal corresponding to an Internet data signal representing a recitation of the one or more identified highlights according to the ordering;

selectively receiving, via the bi-directional voice communication link, a voice selection signal identifying a selected one of the recited one or more identified highlights;

locating Internet content related to the selected one of the recited one or more highlights;

transmitting, via the bi-directional voice communication link, a voice content signal corresponding to a selected portion of the related Internet content; and absent receipt of the voice selection signal, responding to the voice response signal, automatically repeating the comparing and ordering for different portions of the identified information and automatically transmitting a second voice response signal representing a recitation of the identified information according to the automatically repeated ordering.

3. A method of facilitating access to the Internet involving vocal and aural navigation, selection and rendering of Internet content, comprising:

establishing a bidirectional voice communication link between an audio Internet access provider and a user;

receiving, via the bi-directional voice communication link, a voice command signal corresponding to an Internet surfing command;

locating an Internet page corresponding to the Internet surfing command;

identifying one or more highlights associated with the Internet page, where the one or more highlights include a content portion, in addition to one or more links, of the Internet page;

ordering the identified one or more highlights associated with the Internet page;

transmitting, via the bi-directional voice communication link, a voice response signal corresponding to an Internet data signal representing a recitation of the one or more highlights according to the ordering;

selectively receiving, via the bi-directional voice communication link, a voice selection signal identifying a selected one of the recited one or more highlights;

locating Internet content related to the selected one of the recited one or more highlights by:
  locating the related Internet content within the Internet page when the selected one of the recited one or more highlights indicates that the related Internet content is within the Internet page,
  locating another Internet page when the selected one of the recited one or more highlights indicates that the related Internet content is within the another Internet page, and
  analyzing respective portions of selected native Internet content for one or more Internet content characteristics including one or more substantial similarities between one or more words within the selected native Internet content and one or more words within the selected one of the recited one or more highlights, a density of the selected native Internet content, and a density of Internet links within the selected native Internet content;

transmitting, via the bi-directional voice communication link, a voice content signal corresponding to a selected portion of the related Internet content; and absent receipt of the voice selection signal, responding to the voice response signal, automatically repeating the ordering for different ones of the highlights associated with the Internet page and automatically transmitting a second voice response signal representing a representation of the different ones of the highlights according to the automatically repeated ordering.

4. A method of facilitating access to the Internet involving vocal and aural navigation, selection and rendering of Internet content, comprising:

establishing a bi-directional voice communication link between an audio Internet access provider and a user;

receiving, via the bi-directional voice communication link, a voice command signal corresponding to an Internet surfing command;

locating an Internet page corresponding to the Internet surfing command;

identifying one or more highlights associated with the Internet page, wherein the one or more highlights include a content portion, in addition to one or more links, of the Internet page;

ordering the identified one or more highlights associated with the Internet page;

transmitting, via the bi-directional voice communication link, a voice response signal corresponding to an Internet data signal representing a recitation of the one or more highlights according to the ordering;

selectively receiving, via the bi-directional voice communication link, a voice selection signal identifying a selected one of the recited one or more highlights;

locating Internet content related to the selected one of the recited one or more highlights by analyzing respective portions of selected native Internet content for one or more Internet content characteristics including one or more substantial similarities between one or more words within the selected native Internet content and one or more words within the selected one of the recited one or more highlights, a density of the selected native Internet content, and a density of Internet links within the selected native Internet content;

transmitting, via the bi-directional voice communication link, a voice content signal corresponding to a selected portion of the related Internet content; and absent receipt of the voice selection signal, responding to the voice response signal, automatically repeating the ordering for different ones of the highlights associated with the Internet page and automatically transmitting a second voice response signal representing a representation of the different ones of the highlights according to the automatically repeated ordering.

5. The method of claim 4, where analyzing respective portions of selected native Internet content for one or more Internet content characteristics, when a plurality of substantial similarities exist between the one or more words within the selected native Internet content and the one or more words within the selected one of the recited one or more highlights, comprises:

determining a respective amount of Internet page content associated with each one of the plurality of substantial similarities; and establishing an order for the plurality of substantial similarities according to the respective amounts of associated Internet page content.

6. The method of claim 4, where analyzing respective portions of selected native Internet content for one or more Internet content characteristics, when the density of the selected content transcends a predetermined value, comprises:

determining a respective amount of Internet page content associated with each one of the respective portions of the selected native Internet content; and establishing an order for the respective portions of the selected native Internet content according to the respective amounts of associated Internet page content.

7. The method of claim 4, where analyzing respective portions of selected native Internet content for one or more Internet content characteristics, when the density of Internet links within the selected content transcends a predetermined value, comprises transmitting, via the bi-directional voice communication link, another voice response signal corresponding to another Internet data signal representing a recitation of a selected plurality of the Internet links.

8. The method of claim 7, further comprising:
receiving, via the bi-directional voice communication link, another voice selection signal identifying a selected one of the recited selected plurality of the Internet links; and
locating further Internet content related to the selected one of the recited selected plurality of the Internet links.

9. A method of accessing the Internet involving vocal and aural navigation, selection and rendering of Internet content, comprising:
establishing a bi-directional voice communication link between an audio Internet access provider and a user;
initiating access to an Internet page corresponding to an Internet surfing command by transmitting, via the bi-directional voice communication link, a voice command signal corresponding to the Internet surfing command;
receiving, via the bi-directional voice communication link, a voice response signal corresponding to an Internet data signal representing an ordered recitation of one or more highlights identified as being associated with the Internet page responsive to a comparison of the one or more highlights, where the one or more highlights include a content portion, in addition to one or more links, of the Internet page;
initiating access to Internet content related to a selected one of the recited one or more highlights by selectively transmitting, via the bi-directional voice communication link, a voice selection signal identifying the selected one of the recited one or more ordered highlights responsive to an analysis of respective portions of selected native Internet content for one or more Internet content characteristics including;
one or more substantial similarities between one or more words within the selected native Internet content and one or more words within the selected one of the recited one or more highlights,
a density of the selected native Internet content, and
a density of Internet links within the selected native Internet content;
selectively receiving, via the bidirectional voice communication link, a voice content signal corresponding to a selected portion of the related Internet content; and
absent transmission of the voice selection signal, automatically transmitting a second voice response signal representing an ordered recitation of different ones of the highlights identified as being associated with the Internet page responsive to a comparison of the different ones of the highlights.

10. The method of claim 9, where initiating access to Internet content related to a selected one of the recited one or more highlights by selectively transmitting, via the bi-directional voice communication link, a voice selection signal identifying the selected one of the recited one or more highlights responsive to an analysis of respective portions of selected native Internet content for one or more Internet content characteristics, when a plurality of substantial similarities exist between the one or more words within the selected native Internet content and the one or more words within the selected one of the recited one or more highlights, comprises initiating access to Internet content related to a selected one of the recited one or more highlights by transmitting, via the bi-directional voice communication link, a voice selection signal identifying the selected one of the recited one or more highlights responsive to:
a determination of a respective amount of Internet page content associated with each one of the plurality of substantial similarities; and
establishment of an order for the plurality of substantial similarities according to the respective amounts of associated Internet page content.

11. The method of claim 9, where initiating access to Internet content related to a selected one of the recited one or more highlights by:
selectively transmitting, via the bi-directional voice communication link, a voice selection signal identifying the selected one of the recited one or more highlights responsive to an analysis of respective portions of selected native Internet content for one or more Internet content characteristics, when the density of the selected native Internet content transcends a predetermined value, comprises initiating access to Internet content related to a selected one of the recited one or more highlights by transmitting, via the bi-directional voice communication link, a voice selection signal identifying the selected one of the recited one or more highlights responsive to:
a determination of a respective amount of Internet page content associated with each one of the respective portions of the selected native Internet content; and
establishment of an order for the respective portions of the selected native Internet content according to the respective amounts of associated Internet page content.

12. The method of claim 9, where initiating access to Internet content related to a selected one of the recited one or more highlights by selectively transmitting, via the bi-directional voice communication signal identifying the selected one of the recited one or more highlights responsive to an analysis of respective portions of selected native Internet content for one or more Internet content characteristics, when the density of Internet links within the selected native Internet content transcends a predetermined value, comprises receiving, via the bi-directional voice communication link, another voice response signal corresponding to another Internet data signal representing a recitation of a selected plurality of the Internet links.

13. The method of claim 12, further comprising initiating access to further Internet content related to a selected one of the recited selected plurality of the Internet links by selectively transmitting, via the bi-directional voice communication link, another voice selection signal identifying a selected one of the recited selected plurality of the Internet links.

14. A computer readable medium having instructions stored thereon that, when executed by a processor, result in:
establishing a bi-directional voice communication link between an audio Internet access provider and a user;
receiving, via bi-directional voice communication link, a voice command signal corresponding to an Internet command;
retrieving an Internet page corresponding to the Internet command;
identifying information of the Internet page using native content of the Internet page;
comparing sizes of selected portions of text associated with the identified information on the Internet page;

ordering the identified information on the Internet page responsive to the comparing;
transmitting, via the bi-directional voice communication link, a voice response signal corresponding to an Internet data signal representing a recitation of the identified information according to the ordering;
selectively receiving, via the bi-directional voice communication link, a voice selection signal identifying a selected one of the recited identified information;
locating Internet content related to the selected one of the recited information;
transmitting, via the bi-directional voice communication link, a voice content signal corresponding to a selected portion of the related Internet content; and
absent receipt of the voice selection signal, responding to the voice response signal, automatically repeating the comparing and ordering for different portions of the identified information and automatically transmitting a second voice response signal representing a recitation of the different portions of the identified information according to the automatically repeated ordering.

15. An hardware apparatus, comprising:
means for establishing a bi-directional voice communication link between an audio Internet access provider and a user;
means for receiving, via bi-directional voice communication link, a voice command signal corresponding to an Internet command;
means for retrieving an Internet page corresponding to the Internet command;
means for identifying information of the Internet page including means configured to respond to native content of the Internet page;
means for comparing sizes of selected portions of text associated with the identified information on the Internet page;
means for ordering the identified information on the Internet page responsive to the means for comparing;
means for transmitting, via the bi-directional voice communication link, a voice response signal corresponding to an Internet data signal representing a recitation of the identified information according to the order of the indentified information on the Internet page;
means for selectively receiving, via the bi-directional voice communication link, a voice selection signal identifying a selected one of the recited identified information;
means for locating Internet content related to the selected one of the recited information;
means for transmitting, via the bi-directional voice communication link, a voice content signal corresponding to a selected portion of the related Internet content; and
absent receipt of the voice selection signal, means for automatically repeating the comparing and ordering for different portions of the identified information, and means for automatically transmitting a second voice response signal representing a recitation of the different portions of the identified information according to the means for automatically repeating the ordering.

16. A hardware apparatus, comprising:
a transaction processing unit including a processor and configured to:
establish a bi-directional voice communication link between an audio Internet access provider and a user;
receive, via bi-directional voice communication link, a voice command signal corresponding to an Internet command; and
retrieve an Internet page corresponding to the Internet command; and
an understanding unit configured to:
identify information of the Internet page using native content of the Internet page;
compare sizes of selected portions of text associated with the identified information on the Internet page;
order the identified information on the Internet page responsive to the comparison;
cause transmission of, via the bi-directional voice communication link established by the transaction processing unit, a voice response signal corresponding to an Internet data signal representing a recitation of the identified information according to the order of the identified information;
cause selective reception of, via the bi-directional voice communication link established by the transaction processing unit, a voice selection signal identifying a selected one of the recited identified information;
locate Internet content related to the selected one of the recited information;
cause transmission of, via the bi-directional voice communication link established by the transaction processing unit, a voice content signal corresponding to a selected portion of the related Internet content; and
absent receipt of the voice selection signal, automatically repeating the comparing and ordering for different portions of the identified information and automatically causing transmission of a second voice response signal representing a recitation of the different portions of the identified information according to the automatically repeated ordering.

17. A method, comprising:
establishing a bi-directional voice communication link between an audio global network access provider and a user;
receiving, via bi-directional voice communication link, a voice command signal corresponding to an global network command;
retrieving an global network page corresponding to the global network command;
identifying information of the global network page using native content of the global network page;
comparing sizes of a plurality of selected portions of text associated with the identified information on the global network page;
ordering the plurality of selected portions of identified information on the global network page responsive to the comparing;
transmitting, via the bi-directional voice communication link, a voice response signal corresponding to an global network data signal representing a recitation of less than all of the ordered plurality of selected portions of the identified information;
selectively receiving, via the bi-directional voice communication link, a voice selection signal identifying a selected one of the recited less than all of the ordered plurality of selected portions of the identified information;
locating global network content related to the selected one of the less than all of the ordered plurality of selected portions of the recited information;
transmitting, via the bi-directional voice communication link, a voice content signal corresponding to a selected portion of the related global network content; and
absent receipt of the voice selection signal, automatically transmitting a second voice response signal representing a recitation of different ones of the ordered plurality of selected portions of the identified information.

18. An apparatus implemented on a computer comprising:
a transaction processing unit including a computer processor and configured to:
  establish a bi-directional voice communication link between an audio Internet access provider and a user;
  receive, via bi-directional voice communication link, a voice command signal corresponding to an Internet command; and
  retrieve an Internet page corresponding to the Internet command; and an understanding unit configured to:
  identify information of the Internet page using native content of the Internet page;
  compare sizes of a plurality of selected portions of text associated with the identified information on the Internet page;
  order the plurality of selected portions of identified information on the Internet page responsive to the comparison;
  cause transmission of, via the bi-directional voice communication link established by the transaction processing unit, a voice response signal corresponding to an Internet data signal representing a recitation of less than all of the ordered plurality of selected portions of the identified information;
  cause selective reception of, via the bi-directional voice communication link established by the transaction processing unit, a voice selection signal identifying a selected one of the recited less than all of the ordered plurality of selected portions of the identified information;
  locate Internet content related to the selected one of the less than all of the ordered plurality of selected portions of the recited information;
  cause transmission of, via the bi-directional voice communication link established by the transaction processing unit, a voice content signal corresponding to a selected portion of the related Internet content; and
  absent receipt of the voice selection signal, automatically transmitting a second voice response signal representing a recitation of different ones of the ordered plurality of selected portions of the identified information.

* * * * *

UNITED STATES PATENT AND TRADEMARK OFFICE
CERTIFICATE OF CORRECTION

PATENT NO. : 7,712,020 B2 Page 1 of 1
APPLICATION NO. : 10/104430
DATED : May 4, 2010
INVENTOR(S) : Emdadur R. Khan It is certified that error appears in the above-identified patent and that said Letters Patent is hereby corrected as shown below:

In the Claims:

Column 17, line 22 (Claim 15): Delete "An" and replace with --A--; and

Column 17, line 44 (Claim 15): Delete "indentified" and replace with --identified--.

Signed and Sealed this

Fifth Day of October, 2010

David J. Kappos
*Director of the United States Patent and Trademark Office*